United States Patent
Brucker et al.

(10) Patent No.: US 9,537,893 B2
(45) Date of Patent: Jan. 3, 2017

(54) ABSTRACT EVALUATION OF ACCESS CONTROL POLICIES FOR EFFICIENT EVALUATION OF CONSTRAINTS

(71) Applicants: Achim D. Brucker, Karlsruhe (DE); Helmut Petritsch, Karlsruhe (DE)

(72) Inventors: Achim D. Brucker, Karlsruhe (DE); Helmut Petritsch, Karlsruhe (DE)

(73) Assignee: SAP SE, Walldorf (DE)

( * ) Notice: Subject to any disclaimer, the term of this patent is extended or adjusted under 35 U.S.C. 154(b) by 86 days.

(21) Appl. No.: 14/326,660

(22) Filed: Jul. 9, 2014

(65) Prior Publication Data

US 2016/0014155 A1 Jan. 14, 2016

(51) Int. Cl.
G06F 21/00 (2013.01)
H04L 29/06 (2006.01)

(52) U.S. Cl.
CPC ............. *H04L 63/20* (2013.01); *H04L 63/102* (2013.01)

(58) Field of Classification Search
USPC ............................................................ 726/1
See application file for complete search history.

(56) References Cited

U.S. PATENT DOCUMENTS

| 6,854,014 | B1* | 2/2005 | Amin | ............... H04L 12/14 370/352 |
|---|---|---|---|---|
| 7,734,682 | B2 | 6/2010 | Aubry | |
| 8,056,802 | B2 | 11/2011 | Gressel | |
| 8,200,527 | B1 | 6/2012 | Thompson | |
| 8,473,505 | B2 | 6/2013 | Brucker et al. | |
| 2002/0152319 | A1* | 10/2002 | Amin | ............... H04L 29/06 709/232 |
| 2003/0023880 | A1* | 1/2003 | Edwards | ............ H04L 63/0815 726/1 |
| 2003/0131073 | A1* | 7/2003 | Lucovsky | ............ G06F 21/335 709/219 |
| 2003/0159070 | A1 | 8/2003 | Mayer | |
| 2004/0010709 | A1 | 1/2004 | Baudoin | |
| 2004/0267552 | A1* | 12/2004 | Gilliam | .................. G06F 21/10 705/59 |
| 2005/0182958 | A1 | 8/2005 | Pham | |

(Continued)

OTHER PUBLICATIONS

Marti, A. Barba; Ibanez, J.A. Guerrero; Garcia, D. Hernandez; Rocafort, O. Evaluation of the Authentication Service on the Access Management for Heterogeneous Mobile Communication Networks. Future Generation Communication and Networking, vol. 2. Pub. Date: 2007. http://ieeexplore.ieee.org/stamp/stamp.jsp?tp=&arnumber=4426235.*

Chang, Jie; Zhou, Wen'an; Song, Junde; Lin, Zhiqi. Scheduling Algorithm of Load Balancing Based on Dynamic Policies. 2010 Sixth International Conference on Networkng and Services (ICNS). http://ieeexplore.ieee.org/stamp/stamp.jsp?tp=&arnumber=5460621.*

(Continued)

*Primary Examiner* — Jeremiah Avery
(74) *Attorney, Agent, or Firm* — Fish & Richardson P.C.

(57) ABSTRACT

Implementations of the present disclosure include methods, systems, and computer-readable storage mediums for evaluating access control constraints and include actions of receiving an access control request, obtaining a set of attributes based on an abstract evaluation of a policy, the set of attributes including one or more attributes that could be required to evaluate the access control request, requesting respective values of the one or more attributes in a batch request, receiving the respective values, and providing an access control decision based on the respective values and the policy.

20 Claims, 5 Drawing Sheets

(56) References Cited

U.S. PATENT DOCUMENTS

| | | |
|---|---|---|
| 2005/0198247 A1* | 9/2005 | Perry .................... H04L 7/0008 709/223 |
| 2008/0022362 A1 | 1/2008 | Hinton |
| 2008/0098453 A1 | 4/2008 | Hinton |
| 2008/0270802 A1 | 10/2008 | Ashley |
| 2009/0077105 A1 | 3/2009 | DeAnna |
| 2009/0320093 A1* | 12/2009 | Glazier .................... G06F 8/10 726/1 |
| 2010/0251329 A1 | 9/2010 | Wei |
| 2010/0332504 A1 | 12/2010 | Brucker et al. |
| 2011/0314261 A1 | 12/2011 | Brucker et al. |
| 2012/0137309 A1* | 5/2012 | Makam ................. G06Q 10/10 719/320 |
| 2012/0284767 A1 | 11/2012 | Hockings |
| 2014/0068697 A1 | 3/2014 | Brucker et al. |

OTHER PUBLICATIONS

Demchenko, Yuri; Gommans, Leon; de Laat Cees. Using SAML and XACML for Complex Authorisation Scenarios in Dynamic Resource Provisioning. The Second International Conference on Availability, Reliability and Security. Pub. Date: 2007. http://ieeexplore.ieee.org/stamp/stamp.jsp?tp=&arnumber=4159811.*

Jin, Peng; Fang-Chun, Yang. Description Logic Modeling of Temporal Attribute-Based Access Control. 2006 First International Conference on Communications and Electronics. http://ieeexplore.ieee.org/stamp/stamp.jsp?tp=&arnumber=4156539.*

U.S. Appl. No. 13/925,051, filed Jun. 24, 2013, Brucker et al.
U.S. Appl. No. 13/932,357, filed Jul. 1, 2013, Brucker, et al.
U.S. Appl. No. 13/932,388, filed Jul. 1, 2013, Brucker, et al.

* cited by examiner

ABSTRACT EVALUATION OF ACCESS CONTROL POLICIES FOR EFFICIENT EVALUATION OF CONSTRAINTS

BACKGROUND

Modern enterprise systems, e.g., enterprise resource planning (ERP) systems, customer relationship management (CRM) systems, enforce a variety of different and complex security policies. Moreover, more and more enterprises operate in regulated markets and, thus, need to prove that their information technology (IT) systems comply with applicable compliance regulations.

Modern enterprise systems typically include a variety of dynamic access control constraints that require a complex set of context information for resolution. Access control policies can be provided, which include dynamic access control constraints. A dynamic access control constraint can define which users are allowed to access which resources, e.g., application, data, for a given context. Because a dynamic access control constraint is based on context, it can only be resolved at runtime, e.g., when the system is operating and a user is able to request access to data. Consequently, efficient evaluation and resolution of dynamic constraints impacts the overall performance of the access control enforcement infrastructure, and, thus, the overall performance of the enterprise system.

Enterprise systems can include highly distributed systems, such as enterprise systems based on the service oriented architecture (SOA) paradigm. In such enterprise systems, a central policy decision point (PDP) is provided and requires information, e.g., properties of resources, to evaluate dynamic constraints. This information is only available through the service, which is managing the specific resource that access is being requested to. Consequently, the time needed to evaluate and resolve access control constraints can depend on the number of interactions between the central PDP and the distributed services to resolve all required attributes.

SUMMARY

Implementations of the present disclosure include computer-implemented methods for evaluating access control constraints during runtime of an enterprise system, the methods being performed by one or more processors. In some implementations, methods include actions of receiving an access control request, obtaining a set of attributes based on an abstract evaluation of a policy, the set of attributes including one or more attributes that could be required to evaluate the access control request, requesting respective values of the one or more attributes in a batch request, receiving the respective values, and providing an access control decision based on the respective values and the policy.

These and other implementations can each optionally include one or more of the following features: the abstract policy evaluation includes providing an abstract attribute for an attribute of the policy, for which a value is required, the attribute being included in the one or more attributes; the abstract policy evaluation includes determining that one or more of a rule, a policy and a policy set includes an abstract sub-element, and in response indicating that the one or more of the rule, the policy and the policy set is abstract; the abstract policy evaluation includes determining that a combining algorithm uses an abstract attribute, and in response evaluating all sub-elements of the policy; a minimum number of attributes are included in the set of attributes; the access control request is received by a policy decision point (PDP) from a policy enforcement point (PEP), the PEP transmitting the access control request in response to an access request submitted by a user; and the one or more attributes include a service attribute, a value of which is provided by a service.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to efficiently resolving attributes necessary to evaluate an access control request. In some implementations, an access control request is prompted in response to a user requesting access to a resource, e.g., an application, data. In some examples, in response to the access request of the user, a policy enforcement point (PEP) sends an access control request to a policy decision point (PDP). The PDP evaluates one or more applicable policies, e.g., a security policy, based on a set of attributes, and provides an access control decision, e.g., PERMIT, DENY, to the PEP. Attributes in the set of attributes define a context, in which access to the resource is being requested. The PEP enforces the access control decision, e.g., allows access to the resource (access granted) or prevents access to the resource (access denied).

In accordance with implementations of the present disclosure, abstract policy evaluation is provided to determine the set of attributes required to make the access control decision. In this manner, all attributes that could be required to make the access control decision are included in the set of attributes. In some implementations, values for each attribute in the set of attributes are retrieved in a single batch request, and the access control request is resolved based on the set of attributes. In this manner, all required attributes are provided at once, which significantly reduces the response time of access control systems.

In general, enterprise systems may be required to enforce access control policies. For example, business regulations, e.g., Basel II, the Sarbanes-Oxley Act, can require enforcement of one or more access control policies that include one or more dynamic access control constraints. In some examples, resolution of a dynamic access control constraint depends on a context, e.g., of the user and/or system components when the access request is received. Consequently, a dynamic access control constraint can be described as a context-aware access control constraint.

In some examples, a dynamic access control constraint embodies a security requirement, e.g., a context-aware security requirement. Example context-aware security requirements can include a dynamic separation-of-duties and a dynamic need-to-know principle. For example, and with respect to separation-of-duties, a user may only be allowed to perform one of two duties, e.g., submit a payment request, approve the payment request, in a first context. However, in a second context, the user may be allowed to perform both duties. Some widely used policy languages, e.g., PERMIS, XACML, do not support such context requirements as first class citizens. Instead, context requirements are encoded as access control constraints, which can create difficulties. In some examples, such policy languages extend traditional access control models with the ability of specifying access control constraints that can query the dynamic system context during evaluation.

In distributed systems, e.g., following the service-oriented architecture (SOA) paradigm, a plurality of PEPs can be distributed across the system. For example, PEPs can be embedded into different services of the system. In some examples, each PEP communicates with a central PDP. While the values of attributes required for evaluation of the policy need to be available within the PDP, the values of the attributes are often only accessible within the service that is requesting the policy evaluation, e.g., a respective PEP receiving an access request from a user. Consequently, resolving attributes can require substantial network communication between the central PDP and the distributed PEPs. This can result in slow response time and increased consumption of resources, e.g., processors, memory.

Traditional distributed systems can use an iterative trial-and-error approach, or a context provider approach for determining values of the necessary attributes during runtime. In some examples, in the trial-and-error approach, the PDP requests the required attributes from the PEP in a plurality of iterations. Evaluating an access control request can require a service attribute, e.g., a value provided from a respective service. Consequently, the PDP returns a missing attribute message back to the client, e.g., back to the service, to request a value for the missing attribute. In some examples, the PDP can be stateless. That is, for example, the PDP does not store the initial access control request. Consequently, the initial access control request is enhanced with the value of the requested attribute, and is re-submitted by the PEP of the service. If, during the renewed evaluation of the access control request, another service attribute is required, the PDP returns, once again, a missing attribute request to the PEP. This process is done iteratively until all required attributes are included in the access control request.

In some examples, in the context provider approach, the PDP can be in communication with a context provider, e.g., executing on the same network, the same machine, within the same process. In some examples, the context provider is responsible for resolving all types of attributes used in the access control policy. Consequently, the context provider includes logic to determine how and where the required attribute can be resolved based on the type of attribute. For resolving service attributes, described in further detail herein, the context provider queries the service or the PEP that submitted the access control request over, for example, an additional web service interface, to resolve the attribute on client side. Consequently, the context provider must be able to communicate with each PEP in the distributed system. Further, and in some examples, the access control request is asynchronous. Consequently, some state information has to be sent through the PDP and the context provider back to the resolving part of the client, e.g., the service or the PEP.

Both the trial-and-error approach and the context provider approach suffer from the PDP being unable to provide any information about attributes that may be required for the further evaluation. Consequently, every attribute is requested on its own, producing some overhead, e.g., consuming bandwidth, computational power, and/or memory. Furthermore, in the trial-and-error approach, the evaluation has to be started from the beginning at each iteration. That is, already evaluated parts of the policy have to be re-evaluated, causing a significant increase in overhead.

In contrast, implementations of the present disclosure provide abstract evaluation techniques to compute, at runtime, the set of attributes required to resolve an access control request, and to retrieve values for each attribute in the set of attributes in a single, batch request. In this manner, the communication overhead can be significantly reduced, e.g., multiple requests are not required to obtain attribute values. In some examples, runtime indicates operation of the enterprise system, during which access control requests can be transmitted. In some implementations, a relevant access control policy, i.e., an access control policy that is to be evaluated to resolve the received request, is abstractly evaluated for all unknown attributes. In this manner, all attributes that could be required to resolve the access control request for the current state (context) are captured. Consequently, a minimum number of attributes are included in the set of attributes required to resolve the request. That is, only attributes that could be used to evaluate the policy are included in the set of attributes. For example, attributes that are included in the policy, but are not needed to evaluate the policy are not included in the set of attributes. This reduces the amount of data, e.g., attribute values, that need to be requested, e.g., by the PDP, to resolve the request, thereby reducing response time and resources needed. Further, implementations of the present disclosure minimize the request/response cycle, e.g., to two. For example, the PDP can receive an access control request, can provide the set of attributes required, can request values for the attributes, can receive values of the attributes, and can provide a response to the access control request.

Figure 1:
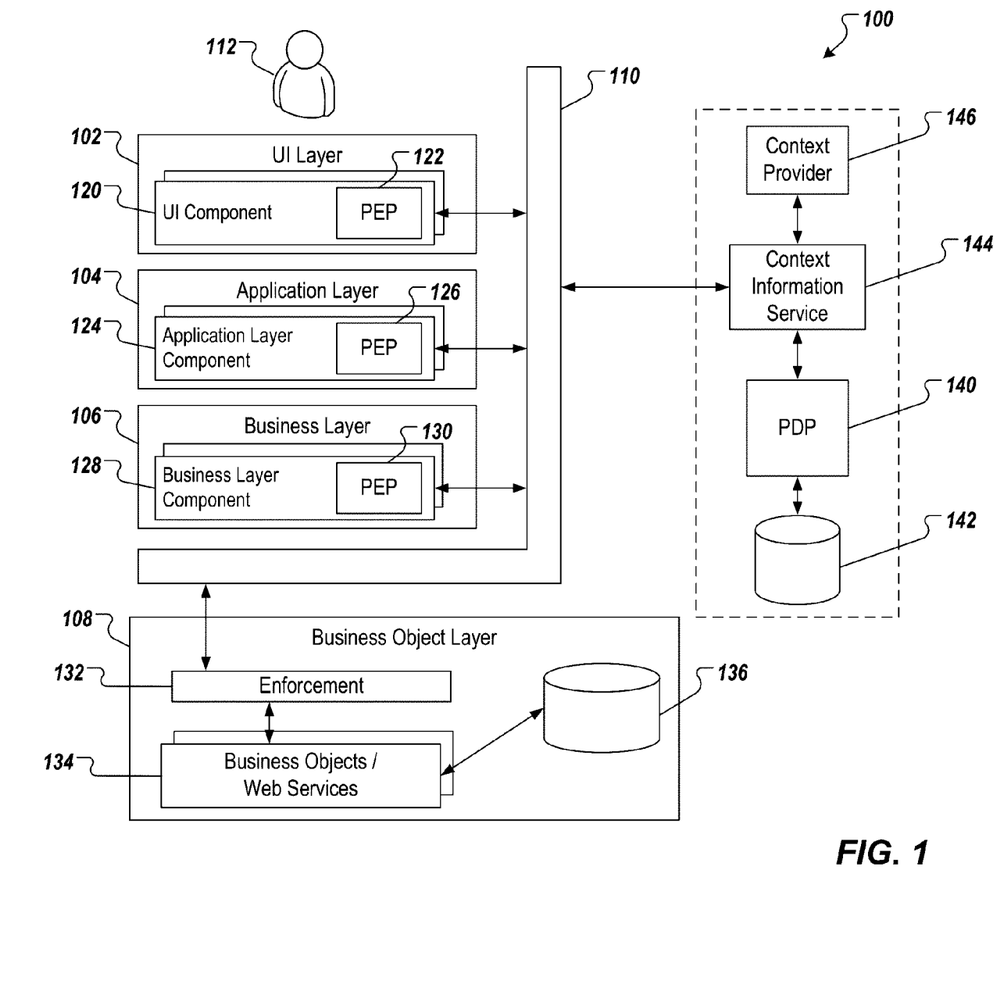
FIG. 1 depicts an example system architecture in accordance with implementations of the present disclosure.

FIG. 1 depicts an example system architecture 100 in accordance with implementations of the present disclosure. The example system architecture 100 includes an example service-oriented architecture (SOA) environment. It is contemplated, however, that implementations of the present disclosure can be applicable in any appropriate type of environment, e.g., cloud-based environments.

In some examples, SOAs provide business services by orchestrating a set of loosely coupled technical services. In some examples, policy-based authentication and authorization in such systems rely on centralized components. In some examples, single sign-on protocols, e.g., using security assertion markup language (SAML), provide a comfortable way to authenticate users within distributed systems using a centralized authentication server storing user credentials, e.g., username, password. Similarly, authorization can be provided by the centrally managed and administered PDP. In some examples, the PDP accesses stored access control policies for all secured services and evaluates access control requests, e.g., requests asking whether a particular user is allowed to access a certain resource (application, data), based on the access control policy. In some examples, enforcement of the access control policy is decentralized, e.g., each and every secured service embeds a PEP that enforces the access control policy based on the response to the access control request from the PDP.

FIG. 1 depicts a generic security architecture for SOA-based systems that use decentralized PEPs to send access control requests to a central PDP for evaluating access control policies. In the example of FIG. 1, the example system architecture 100 includes a user interface (UI) layer 102, an application layer 104, a business layer 106, a business object layer 108, and one or more communication channels 110. In some examples, the UI layer 102, the application layer 104, the business layer 106, and the business object layer 108 can communicate with one another through the one or more communication channels 110. An example communications channel 110 includes a network, e.g., a large computer network, such as a local area network (LAN), a wide area network (WAN), the Internet, a cellular network, or a combination thereof.

In some implementations, each of the UI layer 102, the application layer 104, and the business layer 106 are provided as one or more computer-executable programs executed by one or more computing devices, e.g., a client-side computer. In the depicted example, the UI layer 102 includes one or more UI components 120, each with a respective PEP 122, the application layer 104 includes one or more application layer components 124, each with a respective PEP 126, and the business layer 106 includes one or more business layer components 128, each with a respective PEP 130.

In some implementations, the business object layer 108 can be provided by one or more server systems. In the depicted example, the business object layer 108 includes an enforcement component 132, one or more business object components or web service components 134, and a business object repository 136.

The example system architecture 100 further includes a PDP 140 that selectively access one or more access control policies stored in a policy repository 142. In the depicted example, the example environment 100 also includes a context information service 144 and a context provider 146. The operation of each of these components is described in further detail herein.

Implementations of the present disclosure will be described in further detail herein with reference to an example use case. The example use case includes an enterprise system, e.g., the example environment 100 of FIG. 1, providing business functionality, and enforcing one or more access control policies. It is contemplated, however, that implementations of the present disclosure can be realized in any appropriate use case, e.g., healthcare.

In the example use case, an access control policy can be provided for a business-driven system that manages, among other functions, a travel approval process that is to ensure that no employee is able to approve their own business travel. In this example, it can also be provided that travel requests can only be approved during business hours, e.g., between 0800 and 1800 (in 24-hour format). The following example listing illustrates a simplified XACML policy modeling this aspect using access control constraints. In the example listing, travel requests are modeled as resource (TravelRequest) and the approval is modeled as an action (approve).

---

Listing 1: Modeling dynamic separation of duty
in XACML using access control constraints

---

```
<Policy RuleCombAlg ="first-applicable">
    <Target>
        <Resource>TravelRequest</Resource>
    </Target>
    <Rule Effect="Deny">
        <Target>
            <Action>approve</Action>
        </Target>
        <Condition FunctionId="string-equal">
            <Attribute>subject</Attribute>
            <Attribute>requestor</Attribute>
        </Condition>
    </Rule>
    <Rule Effect="Permit">
        <Target>
            <Role>ManagerRole</Role>
            <Action>approve</Action>
        </Target>
        <Condition FunctionId="isTrue">
            <Attribute>areBusinessHours</Attribute>
        </Condition>
    </Rule>
</Policy>
```

---

In this example, the constraint is provided that the user requesting the task, which can be obtained by resolving the attribute subject, is different from the user that requested the travel, which can be obtained by resolving the attribute requestor. In some examples, while modeling the constraint "during business hours," the time is determined by resolving the attribute areBusinessHours. For example, if a request is received requesting approval of a travel request, e.g., by the central PDP, it can be determined that values for the attributes subject, requestor, and areBusinessHours are needed to evaluate the access control policy. This example illustrates two different types of attributes: while the time can be resolved within the PDP, values for subject and requestor need to be provided to the PDP, e.g., from the respective PEP. Consequently, the PDP can issue a batch request to request values for both subject and requestor.

As introduced above, attributes can be classified with respect to the runtime environment. For example, information about a resource may only be available in the context of the service requesting evaluation of an access control policy. In contrast, information about a user, e.g., the roles that is assigned to the user, might only be available from the PDP. In some implementations, the set of attributes can be categorized into three subsets: PDP attributes, service attributes, and global attributes. In some examples, values of PDP attributes are available within the centralized security infrastructure, i.e., the central PDP. For example, a role hierarchy, e.g., employee, manager, administrator, is an example of a PDP attribute. In some examples, values of service attributes are only available within the client application or service. Example service attributes include the owner of a resource, and specific attributes of a resource, e.g., balance of a bank account, and a number of threads running on an application server. In some examples, values of global attributes can be provided from either the PDP or the service. For example, this is the case for attributes that need to be resolved by an additional service, e.g., the single sign-on or identity provider. In some implementations, the set of attributes provided by the PDP in response to receiving an access control request includes only service attributes. In some examples, the set of attributes includes service attributes and other types of attributes.

As introduced above, implementations of the present disclosure enable all values for attributes in a set of attributes to be provided in a single response to a single, batch request for the values. That is, values for required attributes, e.g., service attributes, can be requested in one batch request, which results in a significant performance increase. More particularly, the single batch request reduces the time required to resolve, e.g., obtain values for, access control attributes and, thus, increases the performance of access control requests.

Evaluation of an access control policy and, therefore, the attributes needed for the evaluation, depends on the values of the attributes. For example, and with reference to the example listing described above, the rule Effect="Deny" returns a decision based on values of the attributes subject and requestor. Furthermore, and depending on the rule combining algorithm defined by the encapsulating policy element, the evaluation of further rules may or may not be necessary. For example, in Listing 1, the evaluation of the rule Effect="Deny" may be omitted (depending on the actual values of the attributes), because the rule combining algorithm RuleCombAlg="first-applicable" enforces the first found decision. Consequently, a challenge in evaluating access control policies is that the evaluation of a policy requires concrete values to come to a concrete access control decision.

To address this challenge, implementations of the present disclosure provide an abstract policy evaluation that enables an access control policy to be evaluated with abstract attributes. In some examples, an abstract attribute is a variable (placeholder) for attributes that cannot immediately be resolved during policy evaluation, e.g., a value must be provided to the PDP. In the example context of travel approval, a cost of the travel can be a value that must be provided to the PDP, e.g., the PDP cannot resolve the value for the cost. In this case, a variable, e.g., "cost," is provided as an abstract attribute. In general, and as described herein, an abstract attributes can be provided for every attribute of a policy that is required, but not available for evaluation of the policy. In the example of Listing 1, such an attribute can include requestor.

In some implementations, an evaluation engine is provided that performs the abstract policy evaluation in response to an access control request. In some examples, the evaluation engine is provided as a component of the central PDP in a distributed system. In some examples, abstract policy evaluation includes providing an abstract attribute for each attribute that cannot be resolved. In general, if an abstract attribute were not provided, an error would occur, halting further evaluation of the policy. For example, if an attribute cannot be resolved, an error would occur and some error handling, e.g., aborting the policy evaluation and providing an error message, exclude the rule using the non-resolvable attribute, would be provided. In accordance with implementations of the present disclosure, instead of triggering such an "error state," an abstract attribute is provided (instead of a concrete, resolved value) is provided for a non-resolvable attribute, and evaluation of the policy can continue. This enables those parts of the policy to be evaluated, which would be evaluated if the attribute would take any (valid) value. At the end of such an abstract evaluation, the set of abstract attributes is provided as the set of attributes, for which values are needed to evaluate the access control policy and provide a response. In some examples, and as described herein, values for the attributes in the set of attributes are requested by the PDP in a single batch request.

Implementations of the abstract evaluation will be described in further detail with reference to Listing 1, and policies provided in XACML in general. It is contemplated that implementations of the present disclosure are not limited to the example of Listing 1 and/or policies provided in XACML.

In general, the goal of abstract evaluation of access control policies is to evaluate those parts of the access control policy that could be evaluated under every possible configuration of non-resolvable attributes, e.g., attributes that cannot be resolved by the PDP, such as service attributes. In some examples, testing of every possible configuration of non-resolvable attributes is not achievable with reasonable effort. Consequently, abstract attributes are provided by (or to) the evaluation engine. Providing abstract attributes can have multiple effects. For example, every result that is based on an abstract attribute is also considered as abstract. As another example, whenever a function is working with abstract attributes, lazy evaluation techniques are not applied, e.g., a lazy or prevents the evaluation of further elements, if the first true is found.

In some implementations, abstract evaluation is based on one or more requirements. An example requirement, in the example case of XACML, can provide that, whenever a Rule, Policy or PolicySet contains an abstract sub-element, the Rule, Policy or PolicySet is also considered as abstract. In some examples, a policy set is a set that contains zero or more policies, and can be used to structure policies to improve maintainability, for example. In some examples, if an abstract attribute is provided for the attribute subject in Listing 1, the rule Effect="Deny" and the Policy are abstract. Another example requirement can provide that combining algorithms are treated as functions. Consequently, whenever a combining algorithm uses an abstract attribute, e.g., an abstract Rule, Policy, PolicySet or attribute, no lazy evaluation can be applied. That is, all sub-elements (rules and/or policies) have to be evaluated. For example, if the condition FunctionId="string-equal" of Listing 1 is abstract, the rule combining algorithm RuleCombAlg="first-applicable" of Listing 1 has to evaluate sub-elements, e.g., the rule Effect="Permit". Another example requirement, and in the example case of XACML, provides that only the functions and and or (from the standard library) have to be re-implemented to behave correctly under abstract evaluation, i.e., no lazy evaluation.

In some implementations, and in the example case of XACML, an abstract attribute is provided whenever a service attribute cannot be resolved. In some examples, a mechanism is provided, which monitors the usage of abstract attributes and enables checking of whether one or more sub-elements contain an abstract attribute. This can be done, for example, by retrieving evaluation events of currently evaluated XACML events, and generating an additional XACML element tree, representing the XACML policy under the current evaluation. In some examples, the combining algorithms are re-implemented, such that they are able to detect abstract sub-elements and switch to non-lazy evaluation, in cases where abstract sub-elements are provided. In some examples, the functions and and or are re-implemented. For example, if either X OR Y have to be true, if X is already true, Y does not have to be evaluated. This is an example of lazy evaluation, e.g., things not needed to make a decision are not evaluated. With abstract attributes, this behavior is changed, because there are no concrete values, in some cases, to base decisions on. That is, and as described above, an abstract attribute is introduced for a value that cannot be resolved, e.g., by the PDP.

In some implementations, after the abstract evaluation, the PDP is able to detect which abstract attributes, if any, have been provided. In some examples, the mechanism responsible for keeping track of abstract attributes can be queried for all abstract attributes used during abstract evaluation to provide the set of attributes, for which values are required. As described herein, this set of attributes can be used to resolve all possibly missing attributes at once.

For example, and with reference to Listing 1, the resource TravelRequest with the action approve can be considered. The attribute subject is contained per default in every request. However, the attribute requestor is missing during evaluation. Consequently, for the attribute requestor, an abstract attribute is provided into the evaluation engine. This makes the condition FunctionId="string-equal" and the rule Effect="Deny" abstract. Consequently, one of the sub-elements of the rule combining algorithm RuleCombAlg="first-applicable" is abstract, which requires the evaluation of all rules in the policy. The attributes required for the evaluation of the rule Effect="Permit" can be resolved. The attribute areBusinessHours can be resolved within the PDP. Consequently, no further abstract attribute is provided.

In general, implementations of the present disclosure can be provided with existing components and concepts for attribute resolution. More specifically, implementations of the present disclosure can be provided by enhancing the PDP to perform abstract policy evaluation using an evaluation engine. In this manner, the PDP can determine the set of attributes at once, eliminating the overhead caused by multiple attribute resolution cycles, e.g., either directly through PEP in the trial-and-error approach, or indirectly through a context provider.

Figure 2:
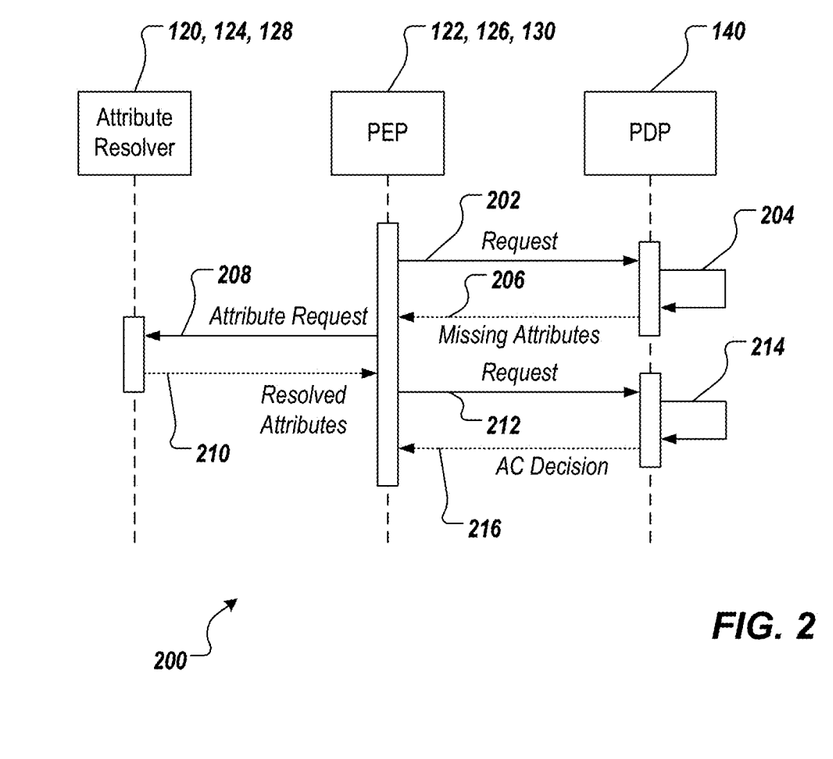
FIG. 2 depicts an example protocol in accordance with implementations of the present disclosure.
Figure 3:
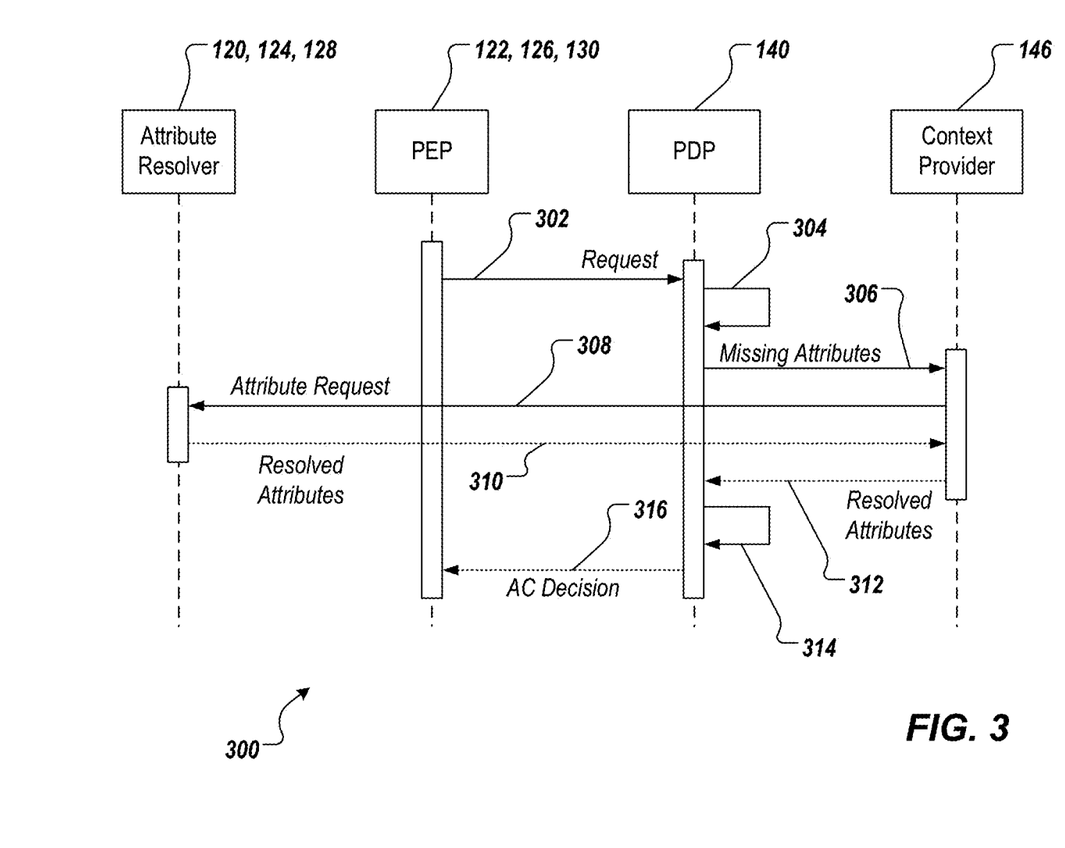
FIG. 3 depicts another example protocol in accordance with implementations of the present disclosure.

FIGS. 2 and 3 depict example protocols 200, 300, respectively, in accordance with implementations of the present disclosure. The example protocol 200 of FIG. 2 includes attribute resolution by requesting required attribute values in a single batch request directly from an attribute resolver, e.g., a resource that can provide the values. The example protocol 300 of FIG. 3 includes attribute resolution by requesting required attribute values in a single batch request through a context provider.

With particular reference to FIG. 2, a PEP 122, 126, 130 sends (202) an access control request to the PDP 140. The PDP performs (204) an abstract policy evaluation based on the access control request and an applicable policy, e.g., retrieved from the policy repository 142. In some examples, and as described herein, one or more abstract attributes are provided based on the abstract policy evaluation, the one or more abstract attributes being attributes that could be required to make an access control decision, and being included in a set of attributes. The PDP 140 sends (206) the set of attributes to the PEP 122, 126, 130, which sends (208) a request for a value of each attribute in the set of attributes to an attribute resolver, e.g., the UI component 120, the application layer component 124, the business layer component 128. In some examples, the attribute resolver is the service, through which the access request was received, e.g., from the user 112.

The attribute resolver sends (210) values for the attributes in the set of attributes to the PEP 122, 126, 130. The PEP 122, 126, 130 sends (212) an access control request to the PDP 140, the access control request including the values of the attributes in the set of attributes. The PDP 140 evaluates (214) the policy based on values of one or more attributes in the set of attributes, and sends (216) an access control decision, e.g., PERMIT, DENY to the PEP 122, 126, 130. In some examples, and as described above, the PEP 122, 126, 130 enforces the policy based on the access control decision.

With particular reference to FIG. 3, a PEP 122, 126, 130 sends (302) an access control request to the PDP 140. The PDP performs (304) an abstract policy evaluation based on the access control request and an applicable policy, e.g., retrieved from the policy repository 142. In some examples, and as described herein, one or more abstract attributes are provided based on the abstract policy evaluation, the one or more abstract attributes being attributes that could be required to make an access control decision, and being included in a set of attributes. The PDP 140 sends (306) the set of attributes to the context provider 146, which sends (308) a request for a value of each attribute in the set of attributes to an attribute resolver, e.g., the UI component 120, the application layer component 124, the business layer component 128. In some examples, the attribute resolver is the service, through which the access request was received, e.g., from the user 112.

The attribute resolver sends (310) values for the attributes in the set of attributes to the context provider 146. The context provider 146 sends (312) the values to the PDP 140. The PDP 140 evaluates (314) the policy based on values of one or more attributes in the set of attributes, and sends (316) an access control decision, e.g., PERMIT, DENY to the PEP 122, 126, 130. In some examples, and as described above, the PEP 122, 126, 130 enforces the policy based on the access control decision.

Figure 4:
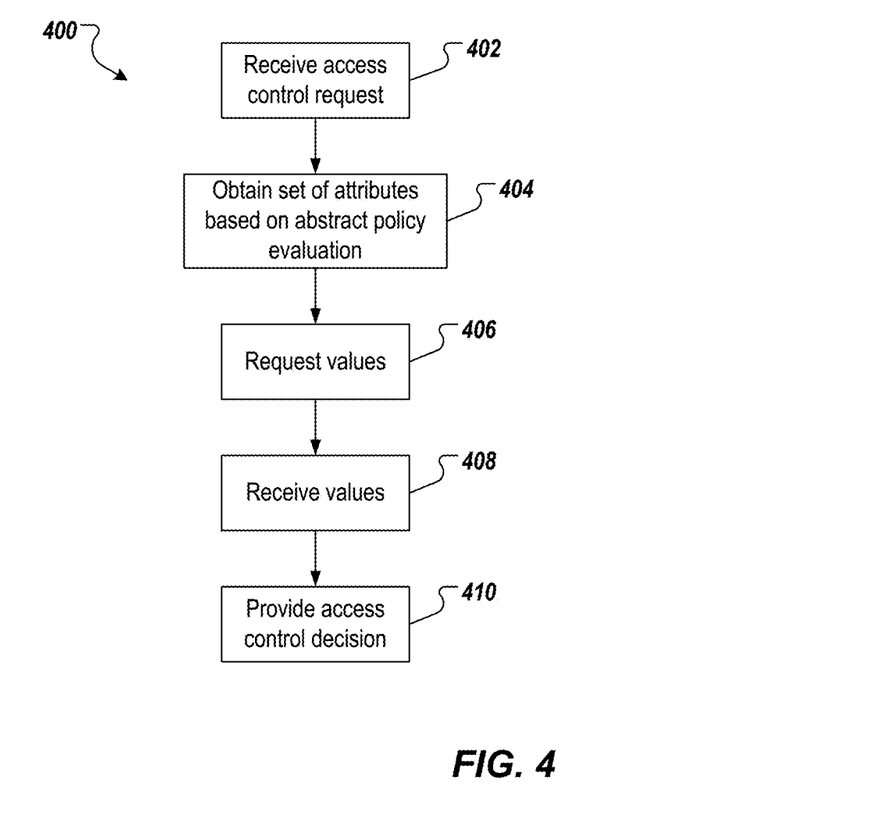
FIG. 4 depicts an example process that can be executed in accordance with implementations of the present disclosure.

FIG. 4 depicts an example process 400 that can be executed in accordance with implementations of the present disclosure. In some implementations, the example process 400 can be realized using one or more computer-executable programs (e.g., a browser, a web application, a mobile application) executed using one or more computing devices (e.g., a client-side computing device, a server-side computing device). An access control request is received (402). In some examples, a PDP receives the access control request from a PEP, the access control request being transmitted by the PEP in response to an access request submitted by a user. A set of attributes is obtained (404). In some examples, the set of attributes includes two or more attributes that could be required to evaluate the access control request. In some examples, the set of attributes is obtained based on an abstract evaluation of a policy. For example, the PDP can include an evaluation engine that provides an abstract attribute for each attribute of the policy that cannot be resolved by the PDP. Values of the one or more attributes are requested in a batch request (406). For example, the PDP can send a single batch request to the PEP, requesting values for the two or more attributes. The respective values are received (408). For example, the PDP receives the values from the PEP. An access control decision is provided based on the respective values and the policy (410). For example, the PDP evaluates the policy based on the values of the attributes and provides an access control decision to the PEP.

Figure 5:
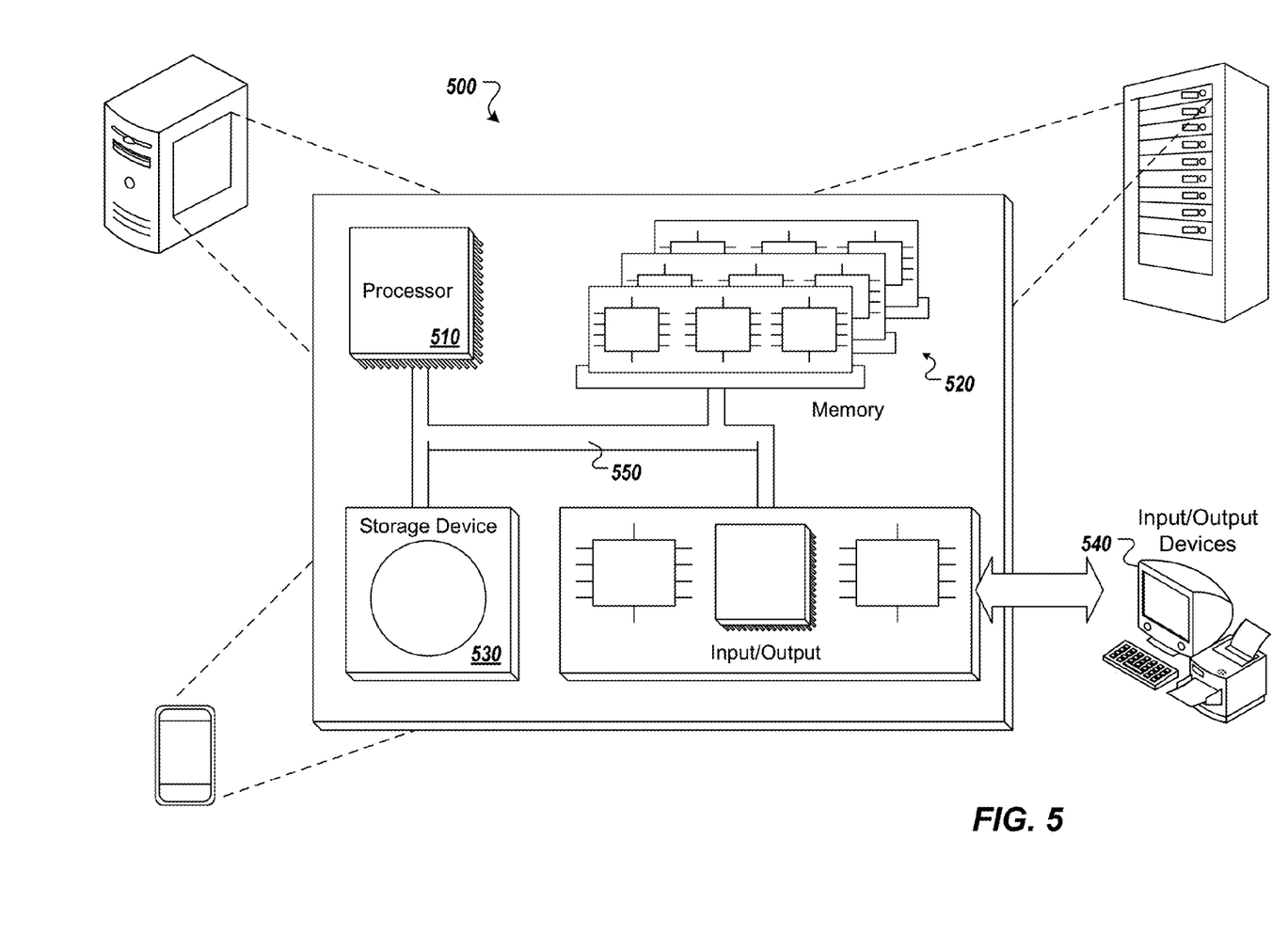
FIG. 5 depicts a schematic diagram of an example computing system.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for evaluating access control constraints, the method being executed using one or more processors and comprising:

receiving, by the one or more processors, an access control request to retrieve respective values of a plurality of attributes in a batch request to reduce a response time of an access control decision by reducing a communication overhead;

obtaining, by the one or more processors, a set of attributes by using a model of a policy that specifies the access control constraints and performs an abstract evaluation of the policy, the abstract evaluation of the policy comprising providing an abstract attribute for each attribute of the set of attributes, such that the set of attributes comprises the plurality of attributes that could be required by a policy decision point (PDP) to provide the access control decision;

requesting, by the one or more processors, the respective values of the plurality of attributes in the batch request;

receiving, by the one or more processors, the respective values; and providing within the response time, by the one or more processors, the access control decision based on the respective values and the policy.

2. The method of claim 1, wherein the abstract attribute comprises a placeholder for each attribute of the set of attributes that cannot be resolved during policy evaluation.

3. The method of claim 1, wherein the abstract policy evaluation comprises determining that one or more of a rule, a policy and a policy set includes an abstract sub-element, and in response indicating that the one or more of the rule, the policy and the policy set is abstract.

4. The method of claim 1, wherein the abstract policy evaluation comprises determining that a combining algorithm uses an abstract attribute, and in response evaluating all sub-elements of the policy.

5. The method of claim 1, wherein a minimum number of attributes are included in the set of attributes, such that only attributes that could be used for the abstract evaluation of the policy are included in the set of attributes.

6. The method of claim 1, wherein the access control request is received by a policy decision point (PDP) from a policy enforcement point (PEP), the PEP transmitting the access control request in response to an access request submitted by a user.

7. The method of claim 1, wherein the one or more attributes comprise a service attribute, a value of which is provided by a service.

8. A non-transitory computer-readable storage medium coupled to one or more processors and having instructions stored thereon which, when executed by the one or more processors, cause the one or more processors to perform operations for evaluating access control constraints, the operations comprising:

receiving an access control request to retrieve respective values of a plurality of attributes in a batch request to reduce a response time of an access control decision by reducing a communication overhead;

obtaining a set of attributes by using a model of a policy that specifies the access control constraints and performs an abstract evaluation of the policy, the abstract evaluation of the policy comprising providing an abstract attribute for each attribute of the set of attributes, such that the set of attributes comprises the plurality of attributes that could be required by a policy decision point (PDP) to provide the access control decision;

requesting the respective values of the plurality of attributes in the batch request;

receiving the respective values; and providing within the response time the access control decision based on the respective values and the policy.

9. The computer-readable storage medium of claim 8, wherein the abstract attribute comprises a placeholder for each attribute of the set of attributes that cannot be resolved during policy evaluation.

10. The computer-readable storage medium of claim 8, wherein the abstract policy evaluation comprises determining that one or more of a rule, a policy and a policy set includes an abstract sub-element, and in response indicating that the one or more of the rule, the policy and the policy set is abstract.

11. The computer-readable storage medium of claim 8, wherein the abstract policy evaluation comprises determining that a combining algorithm uses an abstract attribute, and in response evaluating all sub-elements of the policy.

12. The computer-readable storage medium of claim 8, wherein a minimum number of attributes are included in the set of attributes.

13. The computer-readable storage medium of claim 8, wherein the access control request is received by a policy decision point (PDP) from a policy enforcement point (PEP), the PEP transmitting the access control request in response to an access request submitted by a user.

14. The computer-readable storage medium of claim 8, wherein the one or more attributes comprise a service attribute, a value of which is provided by a service.

15. A system, comprising:
a client-side computing device; and
a computer-readable storage device coupled to the client-side computing device and having instructions stored thereon which, when executed by the client-side computing device, cause the client-side computing device to perform operations for evaluating access control constraints, the operations comprising:

receiving an access control request to retrieve respective values of a plurality of attributes in a batch request to reduce a response time of an access control decision by reducing a communication overhead;

obtaining a set of attributes by using a model of a policy that specifies the access control constraints and performs an abstract evaluation of the policy, the abstract evaluation of the policy comprising providing an abstract attribute for each attribute of the set of attributes, such that the set of attributes comprises the plurality of attributes that could be required by a policy decision point (PDP) to provide the access control decision;

requesting the respective values of the plurality of attributes in the batch request;

receiving the respective values; and providing within the response time the access control decision based on the respective values and the policy.

16. The system of claim 15, wherein the abstract attribute comprises a placeholder for each attribute of the set of attributes of the policy that cannot be resolved during policy evaluation.

17. The system of claim 15, wherein the abstract policy evaluation comprises determining that one or more of a rule, a policy and a policy set includes an abstract sub-element, and in response indicating that the one or more of the rule, the policy and the policy set is abstract.

18. The system of claim 15, wherein the abstract policy evaluation comprises determining that a combining algorithm uses an abstract attribute, and in response evaluating all sub-elements of the policy.

19. The system of claim 15, wherein a minimum number of attributes are included in the set of attributes.

20. The system of claim 15, wherein the access control request is received by a policy decision point (PDP) from a policy enforcement point (PEP), the PEP transmitting the access control request in response to an access request submitted by a user.

* * * * *